US010243676B2

(12) United States Patent
Nakamura et al.

(10) Patent No.: US 10,243,676 B2
(45) Date of Patent: Mar. 26, 2019

(54) INFORMATION DISTRIBUTION SYSTEM

(71) Applicants: Yasuyuki Nakamura, Tochigi (JP);
Tsutomu Kawase, Kanagawa (JP);
Michiaki Shinotsuka, Kanagawa (JP);
Fumihiko Itoh, Kanagawa (JP)

(72) Inventors: Yasuyuki Nakamura, Tochigi (JP);
Tsutomu Kawase, Kanagawa (JP);
Michiaki Shinotsuka, Kanagawa (JP);
Fumihiko Itoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 384 days.

(21) Appl. No.: 15/003,047

(22) Filed: Jan. 21, 2016

(65) Prior Publication Data
US 2016/0218815 A1 Jul. 28, 2016

(30) Foreign Application Priority Data

Jan. 23, 2015 (JP) ................................. 2015-011727

(51) Int. Cl.
H04B 11/00 (2006.01)
G06Q 30/02 (2012.01)
H04L 29/08 (2006.01)
H04W 88/02 (2009.01)
H04W 84/12 (2009.01)

(52) U.S. Cl.
CPC .......... H04B 11/00 (2013.01); G06Q 30/0267 (2013.01); H04L 67/00 (2013.01); H04W 84/12 (2013.01); H04W 88/02 (2013.01)

(58) Field of Classification Search
USPC ........................................................ 367/118
See application file for complete search history.

(56) References Cited

U.S. PATENT DOCUMENTS 6,282,176 B1 * 8/2001 Hemkumar ............... H04B 3/23
370/276
2005/0021292 A1 * 1/2005 Vock .................... A42B 3/0433
702/182

(Continued)

FOREIGN PATENT DOCUMENTS

JP       2012-227631         11/2012
WO    WO-2012137654 A1 *  10/2012    ....... H04N 21/41407

Primary Examiner — James R Hulka
(74) Attorney, Agent, or Firm — Oblon, McClelland, Maier & Neustadt, L.L.P.

(57) ABSTRACT

An information distribution system includes a sound wave transmitter, a mobile terminal, and an information distribution device. The sound wave transmitter transmits identification information to identify the sound wave transmitter. The mobile terminal receives the identification information and transmits the identification information to the information distribution device. The information distribution device is configured to transmit distribution information related to the identification information received from the mobile terminal to the mobile terminal. The information distribution device counts a number of the mobile terminal that transmits each identification information every predetermined period and identification information and transmits the distribution information to the mobile terminal that transmits the identification information in which the number of the mobile terminal reaches a predetermined number.

7 Claims, 19 Drawing Sheets

(56) References Cited

U.S. PATENT DOCUMENTS

| | | | |
|---|---|---|---|
| 2006/0153571 A1* | 7/2006 | Nishimura | G06F 3/011 398/140 |
| 2011/0029370 A1* | 2/2011 | Roeding | G06Q 30/00 705/14.38 |
| 2011/0222373 A1* | 9/2011 | Lee | G01S 5/18 367/124 |
| 2013/0217332 A1* | 8/2013 | Altman | H04H 60/90 455/41.2 |
| 2014/0039654 A1* | 2/2014 | Akiyama | H04N 21/41407 700/94 |
| 2014/0274031 A1* | 9/2014 | Menendez | H04W 52/0209 455/426.1 |
| 2015/0063575 A1* | 3/2015 | Tan | G06F 17/30743 381/56 |

* cited by examiner

FIG.6

| SPEAKER ID | MOBILE TERMINAL ID | ACQUIRED TIME |
|---|---|---|
| SP000001 | XXX-XXXX-1107 | 2014/8/26 15:00 |
| SP000003 | XXX-XXXX-5382 | 2014/8/26 15:01 |
| SP000008 | XXX-XXXX-8109 | 2014/8/26 15:02 |
| SP000001 | XXX-XXXX-1010 | 2014/8/26 15:02 |
| SP000001 | XXX-XXXX-1111 | 2014/8/26 15:03 |

| ADVERTISEMENT NUMBER | STORE NUMBER | NAME OF STORE | DISTRIBUTION PERIOD | ADVERTISEMENT INFORMATION |
|---|---|---|---|---|
| 1 | STORE1 | ○○○ | 8/20-8/27 | ALL 20 % OFF OF ARTICLES |
| 2 | STORE2 | ○○○ | 8/20-8/28 | GIFT PRESENT |
| 3 | STORE3 | ○○○ | 8/20-8/29 | NEW MODEL ARRIVAL |
| 4 | STORE5 | ○○○ | 8/20-8/30 | FREE SERVICE OF COFFEE |
| 5 | STORE6 | ○○○ | 8/21-8/27 | ALL 10 % OFF OF ARTICLES |
| 6 | STORE7 | ○○○ | 8/22-8/28 | UNDER SUMMER CLOTHING CUT-RATE SALE |
| 7 | STORE13 | ○○○ | 8/24-8/29 | AUTUMN MODEL ARRIVAL |
| 8 | STORE19 | ○○○ | 8/23-8/30 | UNDER NET MEMBERS ACCEPTANCE |
| 9 | STORE20 | ○○○ | 8/23-8/27 | UNDER COUPON DISTRIBUTION |
| 10 | STORE27 | ○○○ | 8/24-8/28 | UNDER IDOL VISIT |
| 11 | STORE28 | ○○○ | 8/27-8/29 | UNDER MORNING MARKET ENFORCEMENT |
| 12 | STORE29 | ○○○ | 8/23-8/30 | ALL 10 % OFF OF ARTICLES |

37a

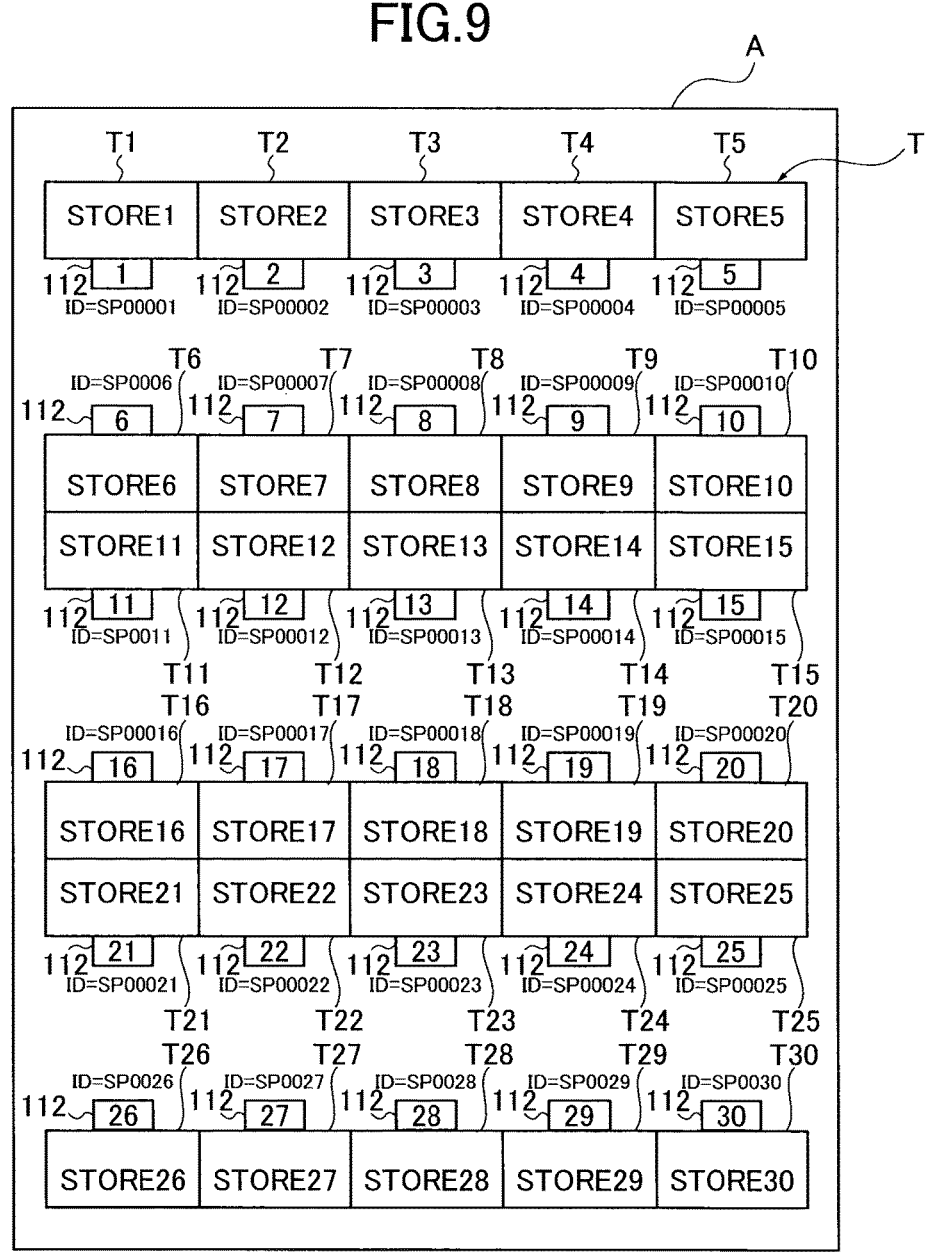

FIG.10

| SPEAKER ID | MOBILE TERMINAL ID |
|---|---|
| SP000001 | XXX-XXXX-1111 |

FIG.11

| STORE1 | STORE2 | STORE3 | STORE4 | STORE5 |
|---|---|---|---|---|
| ID=SP000001 | ID=SP000002 | ID=SP000003 | ID=SP000004 | ID=SP000005 |
| 25 | 3 | 1 | 4 | 6 |
| 5 | 8 | 5 | 8 | 3 |
| ID=SP000006 | ID=SP000007 | ID=SP000008 | ID=SP000009 | ID=SP000010 |
| STORE6 | STORE7 | STORE8 | STORE9 | STORE10 |
| STORE11 | STORE12 | STORE13 | STORE14 | STORE15 |
| ID=SP000011 | ID=SP000012 | ID=SP000013 | ID=SP000014 | ID=SP000015 |
| 3 | 2 | 4 | 9 | 4 |
| 2 | 1 | 5 | 2 | 7 |
| ID=SP000016 | ID=SP000017 | ID=SP000018 | ID=SP000019 | ID=SP000020 |
| STORE16 | STORE17 | STORE18 | STORE19 | STORE20 |
| STORE21 | STORE22 | STORE23 | STORE24 | STORE25 |
| ID=SP000021 | ID=SP000022 | ID=SP000023 | ID=SP000024 | ID=SP000025 |
| 8 | 5 | 4 | 35 | 5 |
| 2 | 20 | 8 | 6 | 3 |
| ID=SP000026 | ID=SP000027 | ID=SP000028 | ID=SP000029 | ID=SP000030 |
| STORE26 | STORE27 | STORE28 | STORE29 | STORE30 |

| SPEAKER ID | STORE NUMBER | DISTRIBUTION PERIOD | DISTRIBUTION INFORMATION |
|---|---|---|---|
| SP000001 | 1 | 8/20-8/27 | ALL 20 % OFF OF ARTICLES |
| SP000024 | 29 | 8/23-8/30 | ALL 10 % OFF OF ARTICLES |
| SP000027 | 27 | 8/24-8/28 | UNDER IDOL VISIT |

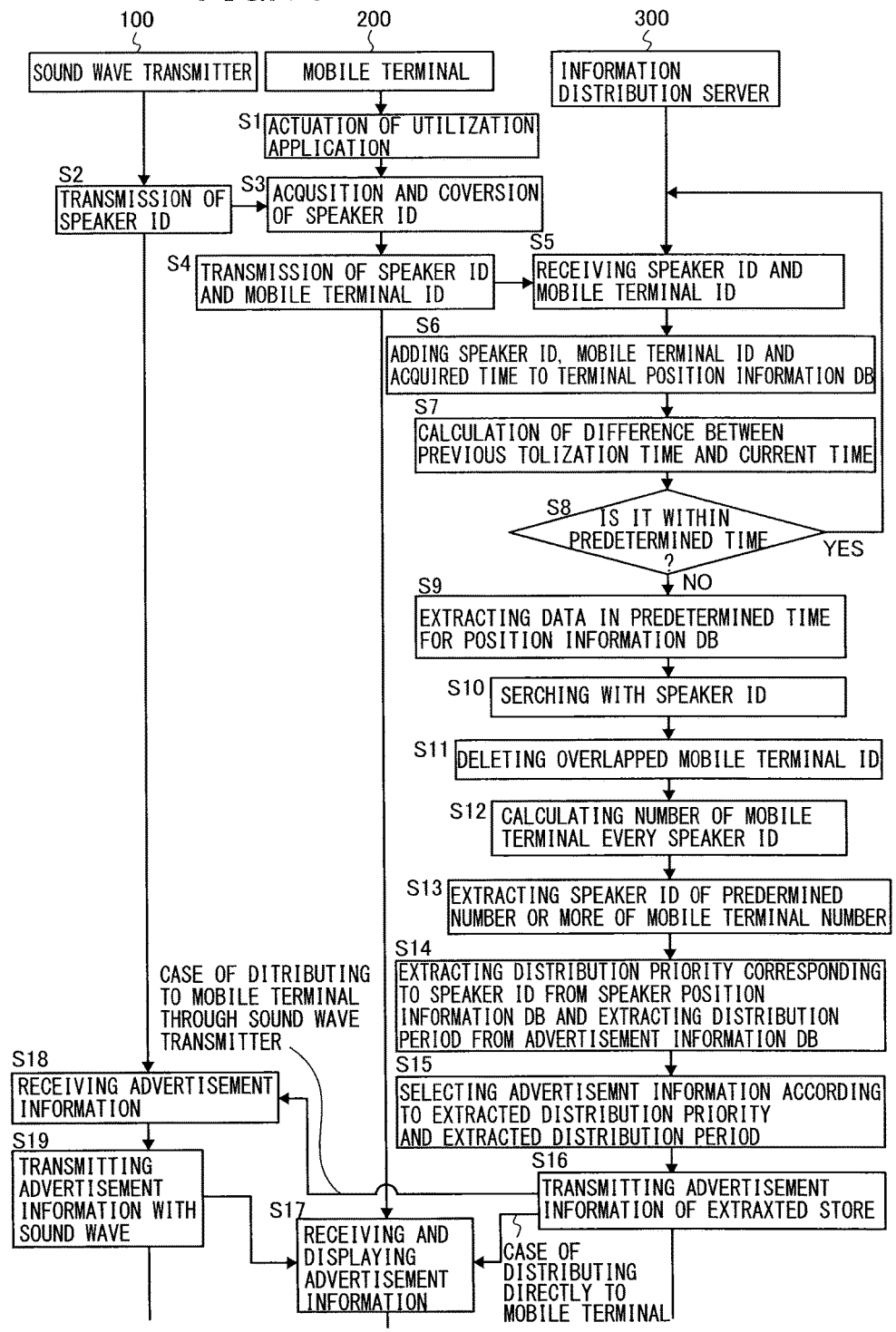

FIG.15

| MOBILE TERMINAL ID ACQUIRED SP 000001 IN CERTAIN PERIOD | MOBILE TERMINAL ID ACQUIRED SP 000001 IN PERIOD BEFORE ONE |
|---|---|
| XXX-XXXX-1107 | XXX-XXXX-1107 |
| XXX-XXXX-1108 | XXX-XXXX-1109 |
| XXX-XXXX-1109 | XXX-XXXX-1110 |
| XXX-XXXX-1110 | XXX-XXXX-1112 |
| XXX-XXXX-1111 | XXX-XXXX-1113 |
| XXX-XXXX-1112 | XXX-XXXX-1115 |
| XXX-XXXX-1113 | XXX-XXXX-1116 |
| XXX-XXXX-1114 | XXX-XXXX-1118 |
| XXX-XXXX-1115 | XXX-XXXX-1119 |
| XXX-XXXX-1116 | XXX-XXXX-1122 |
| XXX-XXXX-1117 | XXX-XXXX-1124 |
| XXX-XXXX-1118 | XXX-XXXX-1126 |
| XXX-XXXX-1119 | XXX-XXXX-1128 |
| XXX-XXXX-1120 | XXX-XXXX-1130 |
| XXX-XXXX-1121 | XXX-XXXX-1131 |
| XXX-XXXX-1122 | XXX-XXXX-1132 |
| XXX-XXXX-1123 | XXX-XXXX-1133 |
| XXX-XXXX-1124 | XXX-XXXX-1134 |
| XXX-XXXX-1125 | XXX-XXXX-1135 |
| XXX-XXXX-1126 | XXX-XXXX-1136 |
| XXX-XXXX-1127 | XXX-XXXX-1137 |
| XXX-XXXX-1128 | XXX-XXXX-1138 |
| XXX-XXXX-1129 | XXX-XXXX-1139 |
| XXX-XXXX-1130 | XXX-XXXX-1140 |
| XXX-XXXX-1131 | XXX-XXXX-1141 |

FIG.16

| STORE1 | STORE2 | STORE3 | STORE4 | STORE5 |
|---|---|---|---|---|
| ID=SP000001 | ID=SP000002 | ID=SP000003 | ID=SP000004 | ID=SP000005 |
| 15 | 0 | 0 | 0 | 0 |
| 0 | 5 | 0 | 0 | 0 |
| ID=SP000006 | ID=SP000007 | ID=SP000008 | ID=SP000009 | ID=SP000010 |
| STORE6 | STORE7 | STORE8 | STORE9 | STORE10 |
| STORE11 | STORE12 | STORE13 | STORE14 | STORE15 |
| ID=SP000011 | ID=SP000012 | ID=SP000013 | ID=SP000014 | ID=SP000015 |
| 1 | 0 | 0 | 6 | 0 |
| 0 | 0 | 0 | 0 | 5 |
| ID=SP000016 | ID=SP000017 | ID=SP000018 | ID=SP000019 | ID=SP000020 |
| STORE16 | STORE17 | STORE18 | STORE19 | STORE20 |
| STORE21 | STORE22 | STORE23 | STORE24 | STORE25 |
| ID=SP000021 | ID=SP000022 | ID=SP000023 | ID=SP000024 | ID=SP000025 |
| 0 | 0 | 0 | 20 | 0 |
| 0 | 15 | 0 | 0 | 0 |
| ID=SP000026 | ID=SP000027 | ID=SP000028 | ID=SP000029 | ID=SP000030 |
| STORE26 | STORE27 | STORE28 | STORE29 | STORE30 |

FIG.17

| SPEAKER ID | STORE NUMBER | DISTRIBUTION PERIOD | DISTRIBUTION INFORMATION |
|---|---|---|---|
| SP000001 | 1 | 8/20-8/27 | ALL 20 % OFF OF ARTICLES |
| SP000024 | 29 | 8/23-8/30 | ALL 10 % OFF OF ARTICLES |
| SP000027 | 27 | 8/24-8/28 | UNDER IDOL VISIT |
| SP000007 | 7 | 8/22-8/28 | UNDER SUMMER CLOTHING CUT-RATE SALE |
| SP000014 | 19 | 8/23-8/30 | UNDER NET MEMBERS ACCEPTANCE |
| SP000020 | 20 | 8/23-8/27 | UNDER COUPON DISTRIBUTION |

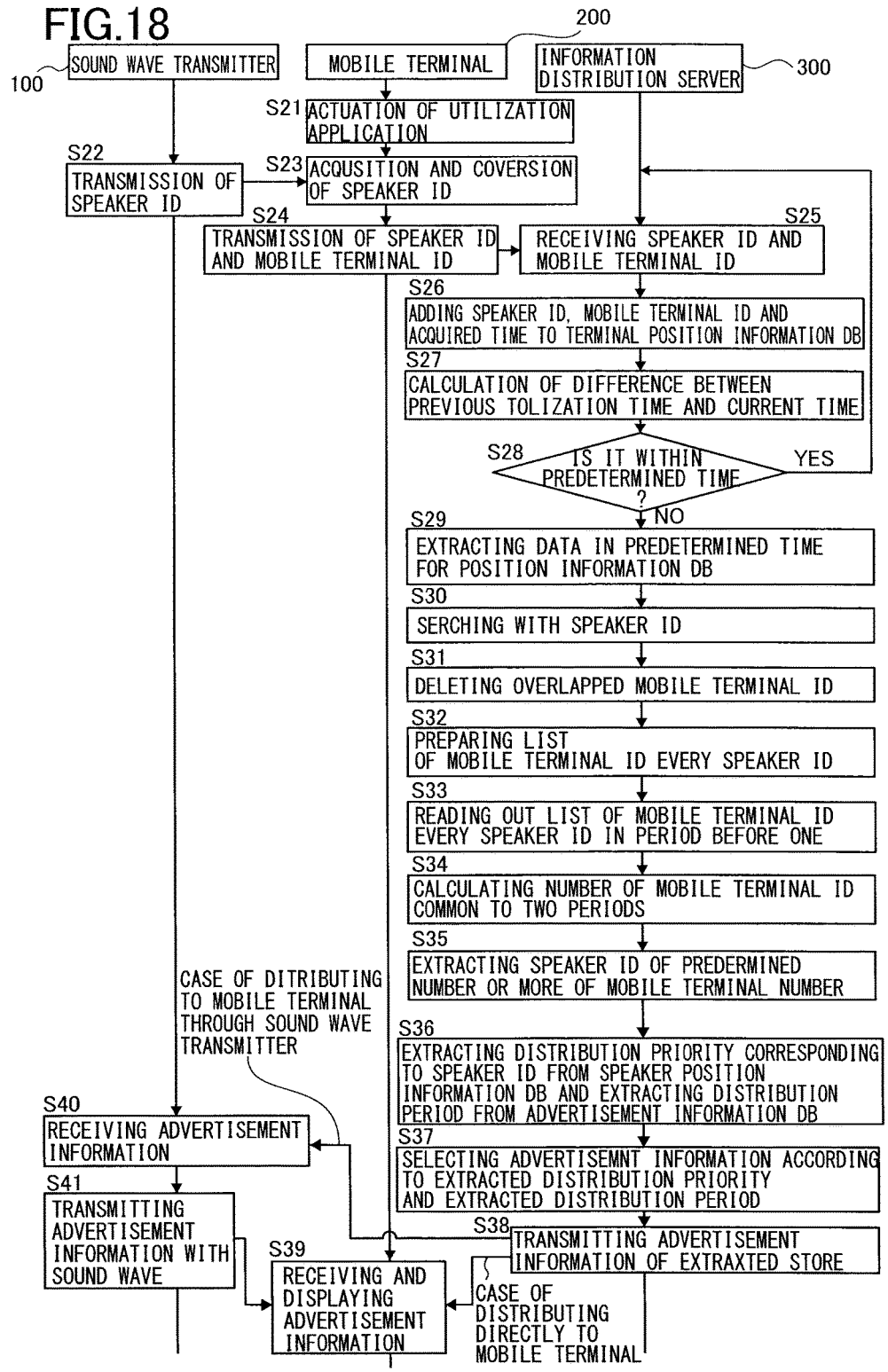

FIG.20

| SPEAKER ID | MOBILE TERMINAL ID | ACQUIRED TIME | DISTRIBUTED ADVERTISEMENT NUMBER | DITRIBUTED TIME |
|---|---|---|---|---|
| SP000001 | XXX-XXXX-1107 | 2014/8/26 10:00 | 1 | 2014/8/26 10:02 |
| SP000001 | XXX-XXXX-1111 | 2014/8/26 10:12 | 1 | 2014/8/26 10:15 |
| SP000001 | XXX-XXXX-1112 | 2014/8/26 12:00 | 1 | 2014/8/26 12:02 |
| SP000001 | XXX-XXXX-1114 | 2014/8/26 13:00 | 1 | 2014/8/26 13:01 |
| SP000001 | XXX-XXXX-1117 | 2014/8/26 11:35 | 1 | 2014/8/26 11:35 |
| SP000001 | XXX-XXXX-1118 | 2014/8/26 14:00 | 1 | 2014/8/26 14:02 |
| SP000001 | XXX-XXXX-1120 | 2014/8/26 11:22 | 1 | 2014/8/26 11:25 |
| SP000001 | XXX-XXXX-1123 | 2014/8/26 14:30 | 1 | 2014/8/26 14:34 |
| SP000001 | XXX-XXXX-1124 | 2014/8/26 10:30 | 1 | 2014/8/26 10:32 |
| SP000001 | XXX-XXXX-1126 | 2014/8/26 13:23 | 1 | 2014/8/26 13:24 |
| SP000001 | XXX-XXXX-1127 | 2014/8/26 14:54 | 1 | 2014/8/26 14:56 |
| SP000001 | XXX-XXXX-1129 | 2014/8/26 13:42 | 1 | 2014/8/26 13:45 |

| SPEAKER ID | MOBILE TERMINAL ID | ACQUIRED TIME | DISTRIBUTED ADVERTISEMENT NUMBER | DITRIBUTED TIME |
|---|---|---|---|---|
| SP000001 | XXX-XXXX-1107 | 2014/8/26 10:00 | 1 | 2014/8/26 10:02 |
| SP000001 | XXX-XXXX-1111 | 2014/8/26 10:12 | 1 | 2014/8/26 10:15 |
| SP000001 | XXX-XXXX-1112 | 2014/8/26 12:00 | 1 | 2014/8/26 12:02 |
| SP000001 | XXX-XXXX-1114 | 2014/8/26 13:00 | 1 | 2014/8/26 13:01 |
| SP000001 | XXX-XXXX-1117 | 2014/8/26 11:35 | 1 | 2014/8/26 11:35 |
| SP000001 | XXX-XXXX-1118 | 2014/8/26 14:00 | 1 | 2014/8/26 14:02 |
| SP000001 | XXX-XXXX-1120 | 2014/8/26 11:22 | 1 | 2014/8/26 11:25 |
| SP000001 | XXX-XXXX-1123 | 2014/8/26 14:30 | 1 | 2014/8/26 14:34 |
| SP000001 | XXX-XXXX-1124 | 2014/8/26 10:30 | 1 | 2014/8/26 10:32 |
| SP000001 | XXX-XXXX-1126 | 2014/8/26 13:23 | 1 | 2014/8/26 13:24 |
| SP000001 | XXX-XXXX-1127 | 2014/8/26 14:54 | 1 | 2014/8/26 14:56 |
| SP000001 | XXX-XXXX-1129 | 2014/8/26 13:42 | 1 | 2014/8/26 13:45 |
| SP000001 | XXX-XXXX-1109 | 2014/8/26 15:00 | 1 | 2014/8/26 15:02 |
| SP000001 | XXX-XXXX-1115 | 2014/8/26 15:00 | 1 | 2014/8/26 15:02 |
| SP000001 | XXX-XXXX-1122 | 2014/8/26 15:00 | 1 | 2014/8/26 15:02 |
| SP000001 | XXX-XXXX-1126 | 2014/8/26 15:00 | 1 | 2014/8/26 15:02 |
| SP000001 | XXX-XXXX-1128 | 2014/8/26 15:00 | 1 | 2014/8/26 15:02 |
| SP000001 | XXX-XXXX-1130 | 2014/8/26 15:00 | 1 | 2014/8/26 15:02 |
| SP000001 | XXX-XXXX-1131 | 2014/8/26 15:00 | 1 | 2014/8/26 15:02 |

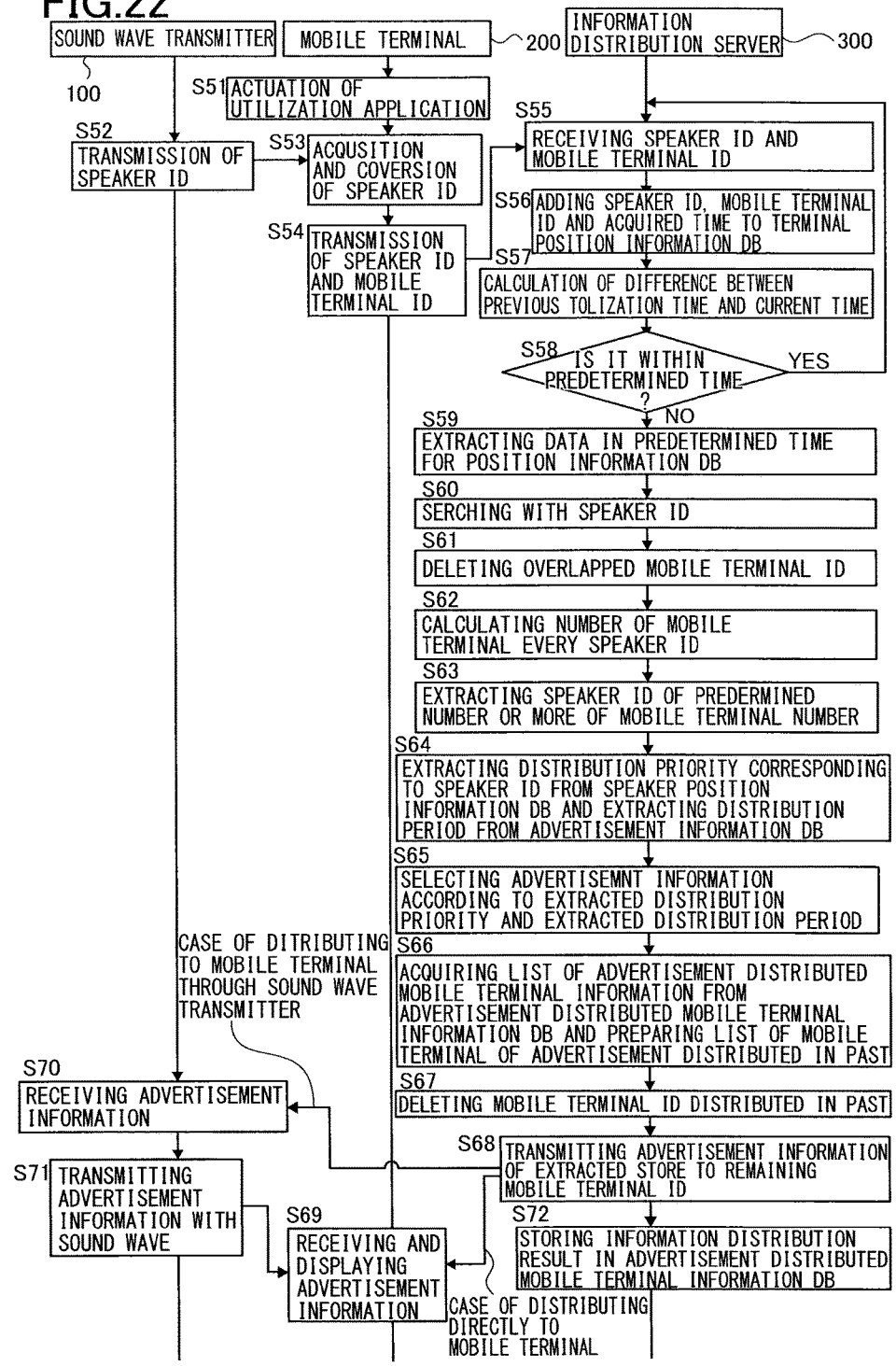

INFORMATION DISTRIBUTION SYSTEM

CROSS-REFERENCE TO RELATED APPLICATION

This application is based upon and claims the benefit of priority to Japanese Patent Application No. 2015-11727, filed on Jan. 23, 2015, the entire disclosures of which are incorporated herein by reference.

BACKGROUND

Technical Field

The present invention relates to an information distribution system.

Description of Related Art

Various technologies that distribute information such as advertisement to users are conventionally known. As one example, a method letting users make member's registration and transmitting store information to a mail address of each user is known. On the other hand, there is also known a method in which, when a user goes to a predetermined place such as a store, advertisement of the store is distributed to a mobile terminal of the user.

However, in the former method, it is hard for a user to look for worth advertisement since a great quantity of advertisement mails is distributed to the user regardless of a place where the user exists. In the latter method, if the number of the stores are large, the user ignores the advertisement similarly to the former method since the advertisement is distributed every passing in front of the store. From the above, the both methods cause an effect of the advertisement to reduce.

BRIEF DESCRIPTION OF DRAWINGS

FIG. 6 is a table representing the terminal position information shown in FIG. 5.

FIG. 7 is a table representing the advertisement information shown in FIG. 5.

FIG. 9 is a table in which positions of stores and positions of speakers are arranged to correspond.

FIG. 10 is a table showing one example of data structure communication information transmitted from the mobile terminal.

FIG. 11 is a table in which the count number of the mobile terminal IDs and each speaker ID are arranged to correspond.

FIG. 14 is a sequence chart showing one example of acquisition operation of the advertisement information in the information distribution system according to the first embodiment.

FIG. 15 is a table showing a list of the mobile terminals acquiring the speaker ID=SP000001 in a period and a period before one.

FIG. 16 is a table in which the count number of the mobile terminal IDs and each speaker ID are arranged to correspond, in the information distribution system according to the second embodiment.

FIG. 17 is a table showing a list of the advertisement information searched in accordance with distribution priority with respect to the speaker IDs in which the number of the mobile terminal IDs is a predetermined number or more, in the information distribution system according to the second embodiment.

FIG. 18 is a sequence chart showing one example acquisition operation of the advertisement information in the information distribution system according to the second embodiment.

FIG. 20 is a table showing one example of a table of advertisement distributed mobile terminal information shown in FIG. 5.

FIG. 21 is a table showing a state where the table of advertisement distributed mobile terminal information is updated.

FIG. 22 is a sequence chart showing one example of acquisition operation of the advertisement information in the information distribution system according to the third embodiment.

DETAILED DESCRIPTION OF EMBODIMENTS

First Embodiment

Figure 1:
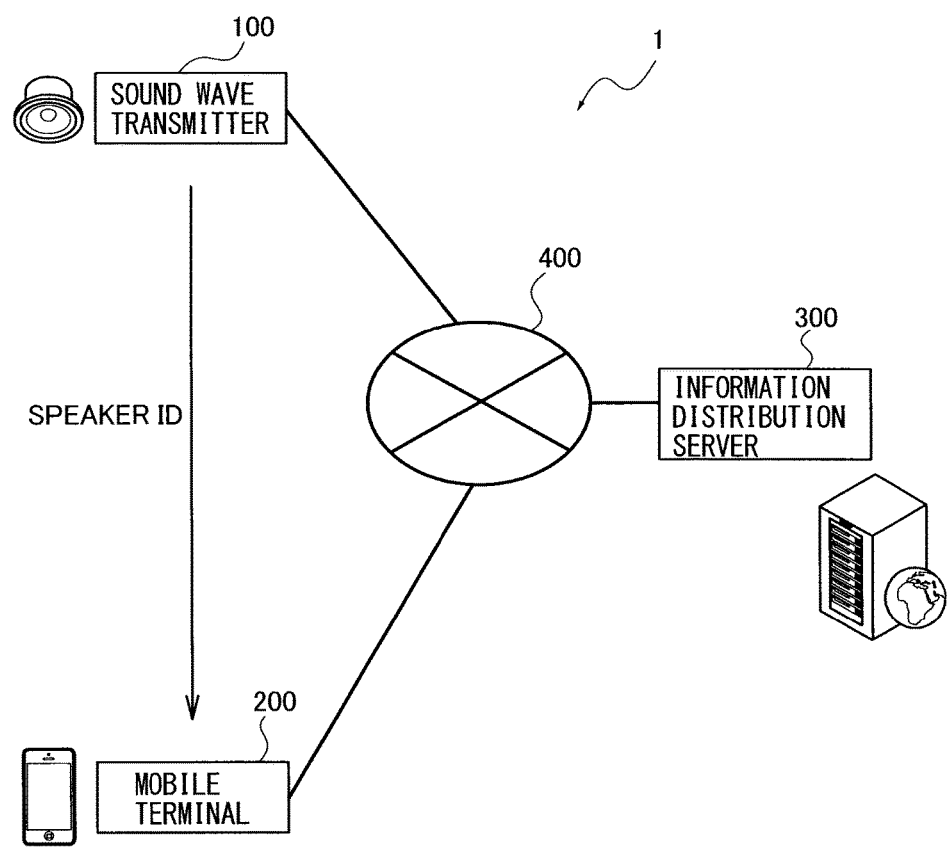
FIG. 1 is a schematic diagram of an information distribution system according to first to third embodiments of the present invention.

An information distribution system according to a first embodiment of the present invention will be described hereinafter with reference to the accompanying drawings. FIG. 1 illustrates a configuration of the information distribution system according to the first embodiment. As shown in FIG. 1, the information distribution system 1 includes a sound wave transmitter 100, a mobile terminal 200, an information distribution server 300 as an information distribution apparatus, and so on. The sound wave transmitter 100, the mobile terminal 200, and the information distribution server 300 are connected to each other through a network 400. A PC terminal for store and a PC terminal for management may be added to them.

The sound wave transmitter 100 includes a speaker, an amplifier, and so on, and broadcasts BGM or announcement in a store, and so on. The sound wave transmitter 100 has a function to broadcast as sound wave a speaker ID as identification information to identify the transmitter's self. The sound wave transmitter 100 is provided, for example, on each store (one example of a portion to be provided) of a shopping center (one example of an institution) or each tenant (as one example of a place to be provided) of a department store or shopping center (one example of an institution).

The mobile terminal 200 has a function to receive the speaker ID transmitted from the sound wave transmitter 100 and transmit the speaker ID together with a mobile terminal ID to the information distribution sever 300, receive and display information transmitted from the information distribution sever 300. The mobile terminal 200 may be configured such that a user carries the mobile terminal 200 and operates it. For example, a mobile phone, a smart phone, a tablet, a Personal Digital Assistant (PDA), a notebook computer and so on may be used as the mobile terminal 200, The information distribution server 300 assigns the speaker ID to each of the sound wave transmitters 100 provided on the stores and controlling the distribution information related to the speaker ID and transmits the speaker ID to each sound wave transmitter 100. In addition, the information distribution server 300 has a function to transmit the distribution information transmitted from the mobile terminal 200 and related to the speaker ID to the mobile terminal 200. It is preferable to provide a plurality of information distribution servers 300 in which, for example, one is provided on a management center and so on, and one every section or floor is provided.

The network 400 is composed of a communication network including a Local Area Network (LAN) or a Wide Area Network (WAN). A public communication circuit such as a telephone circuit may be included in the WAN.

<Configuration of Hardware of Information Distribution System>

Figure 2:
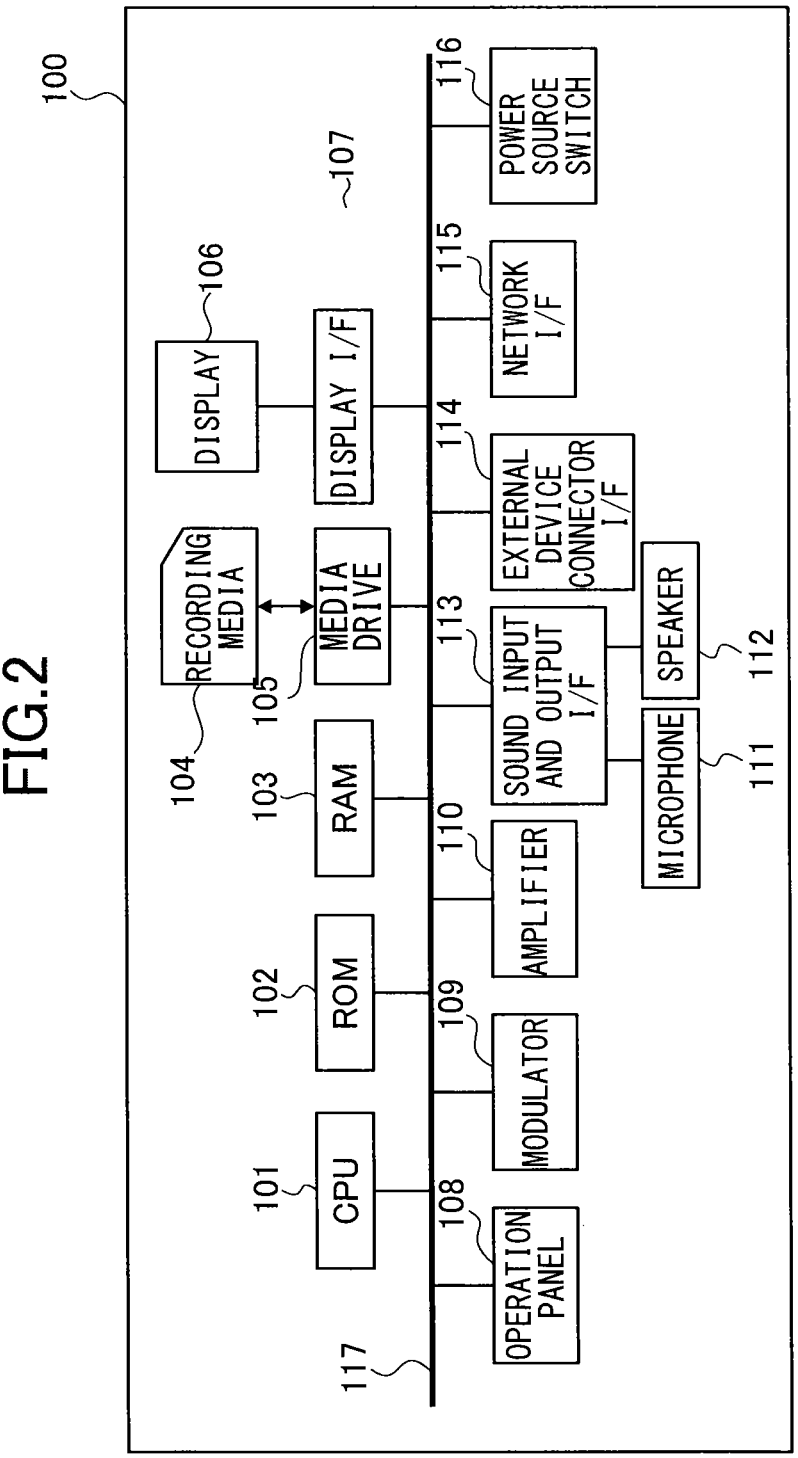
FIG. 2 is a block diagram showing one example of a hardware configuration of a sound wave transmitter.

Next, a configuration of hardware of the information distribution system in the first embodiment is described with reference to FIGS. 2 to 4. FIG. 2 illustrates one example of the configuration of the hardware of the sound wave transmitter 100 according to the first embodiment. The sound wave transmitter 100 includes a CPU 101 that controls an entire operation of the sound wave transmitter 100, a Read Only Memory (ROM) 102 in which a program that executes the CPU 101 is stored, a Random Access Memory (RAM) 103 used as a work area of the CPU 101, a recording medium 104, a media drive 105, a display 106, a display Interface (I/F) 107, an operation panel 108, a modulator 109 that modulates the speaker ID to sound or sound wave, an amplifier 110 that amplifies the modulated sound wave, a microphone 111 that inputs the sound, a speaker 112 that outputs the sound, a sound input/output I/F 113, an external device connector I/F 114, a network I/F 115, a power source switch 116, and a bus line 117 and so on.

The recording medium is composed of a flash memory and so on as a storing part that stores various information of the speaker ID and so on. The media drive 105 controls reading or writing of various data to the recording medium 104 in accordance with the control of the CPU 101. The display 106 displays sound volume, operation message and so on. The display I/F 107 is configured to transmit display data to the display 106 in accordance with the control of the CPU 101. The operation panel 108 acts as an input part that inputs operation and data of the sound wave transmitter 100. The sound input/output I/F 113 processes input and output of a sound signal between the microphone 111 and the speaker 112 in accordance with the control of the CPU 101. The external device connector I/F 114 is configured to connect various external devices. The network I/F 115 is configured to execute data transmission by using the network 400. The power source switch 116 switches ON and OFF of a power source of the sound wave transmitter 100. The bus line 117 includes an address bus, a data bus and so on that electrically connect the foregoing components.

Figure 3:
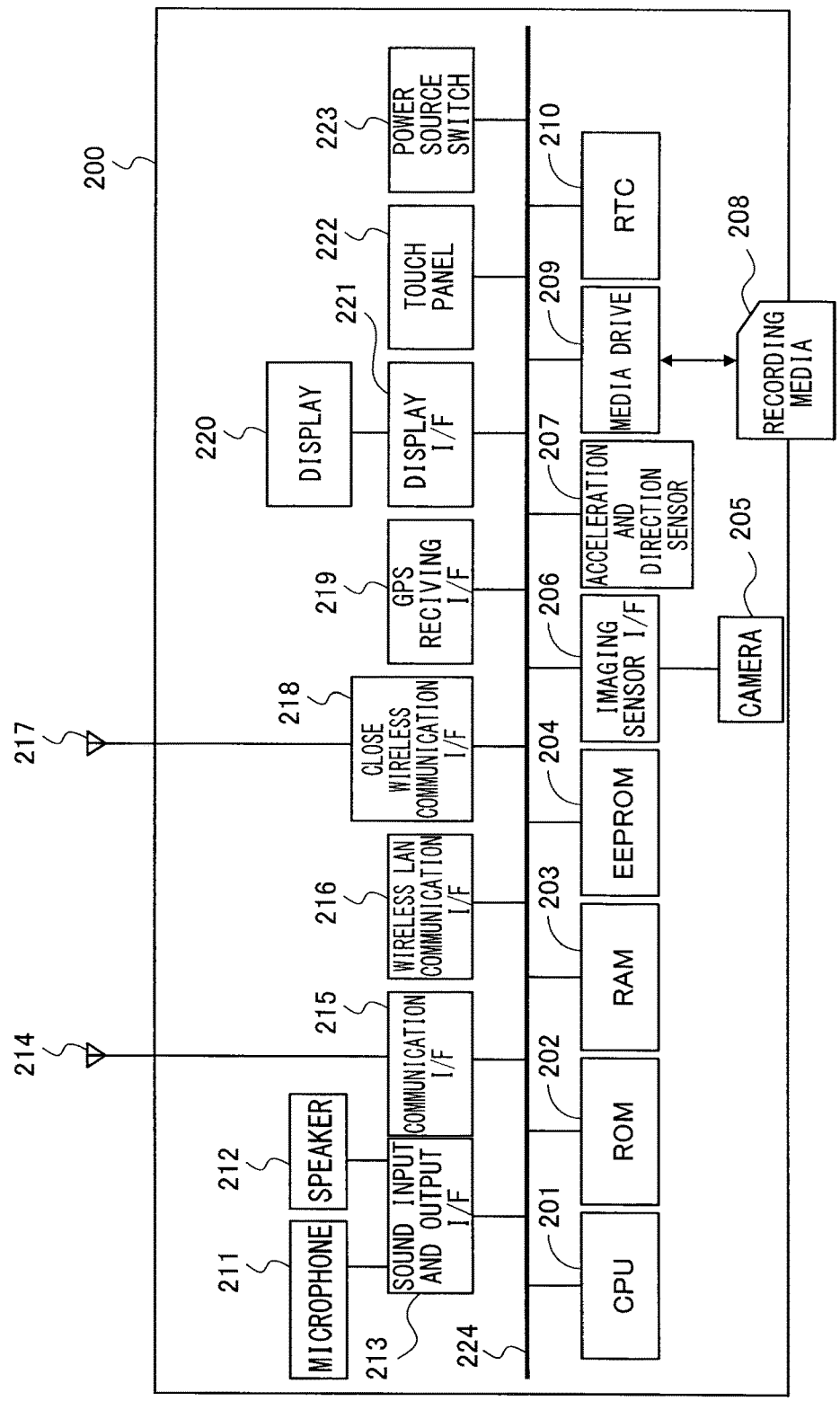
FIG. 3 is a block diagram showing one example of a hardware configuration of a mobile terminal.

FIG. 3 illustrates one example of a configuration of hardware of the mobile terminal 200 according to the first embodiment. The mobile terminal 200 includes a CPU 201, a ROM 202, a RAM 203, an Electrically Erasable Programmable Read-Only Memory (EEPROM) 204, a camera 205, an imaging sensor I/F 206, an acceleration and direction sensor 207, a media drive 209, and an Real Time Clock (RTC) 210. The CPU 201 controls an entire operation of the mobile terminal 200. The ROM 202 stores a program executed by the CPU 201. The RAM 203 is used as a work area of the CPU 101. The EEPROM 204 executes the reading and the writing of data in accordance with the control of the CPU 201. The camera 205 images a subject and acquires image data in accordance with the control of the CPU 201. The imaging sensor I/F 206 controls drive of the camera 205. The acceleration and direction sensor 207 includes an electromagnetic compass, a gyro-compass, an acceleration sensor and so on which detect terrestrial magnetism. The media drive 209 controls the reading and the writing (storing) of data to a recording medium 208 such as a flash memory as a storing part that stores various data of the mobile terminal ID and so on. The RTC 210 is a chip having information of a current time, date, days of week and so on. The recording medium 208 from that already recorded data are read or in that new data are written and stored has an attachable and detachable configuration. The camera 205 includes a solid-state imaging sensor that converts light through a lens into electric charge and electronizes an image (video) of a subject. As the solid-state imaging sensor, a Complementary Metal Oxide Semiconductor (CMOS), a Charge Coupled Device (CCD) and so on can be used.

The mobile terminal 200 further includes a microphone 211, a speaker 212, a sound input and output part I/F 213, an antenna 214, a communication part I/F 215, a wireless LAN communication part I/F 216, a short-distance communication antenna 217, a short-distance wireless communication part I/F 218, a GPS receiving part 219, a display 220, a display I/F 221, a touch panel 222, a power source switch 223, and a bus line 224, and so on. In addition, the mobile terminal 200 includes an exclusive battery by which the mobile terminal is driven.

The microphone 211 has a built-in type that inputs sound. The speaker 212 has a built-in type that outputs sound. The sound input and output part I/F 213 that processes the input and the output of a sound signal between the microphone 211 and the speaker 212 in accordance with the control of the CPU 201. The communication part I/F 215 executes communication between the communication part and a nearest base station through a wireless communication signal by use of the antenna 214. The wireless LAN communication part I/F 216 executes wireless LAN communication depending on the standard of IEEE80212 between the communication part and an access point. The short-distance wireless communication part I/F 218 executes short-distance communication such as BLUETOOTH™, WI-FI™, FELICA™, by use of the short-distance communication antenna 217. The GPS receiving part 219 receives a GPS signal from a GPS satellite. The display 220 is a display part that includes a liquid crystal display, an organic EL or the like and displays image data of a subject, various icons and so on. The display I/F 221 transmits the image data to the display 220. The touch panel 222 is composed of a pressure sensitive or electrostatic panel mounted on the display 220 and configured to detect a touch position on the display 220 by the touch of a finger, touch pen or the like. The power source switch 223 switches ON and OFF of the power source of the mobile terminal 200. The bus line 224 includes an address bus, a data bus and so on that electrically connect the above-described components.

Figure 4:
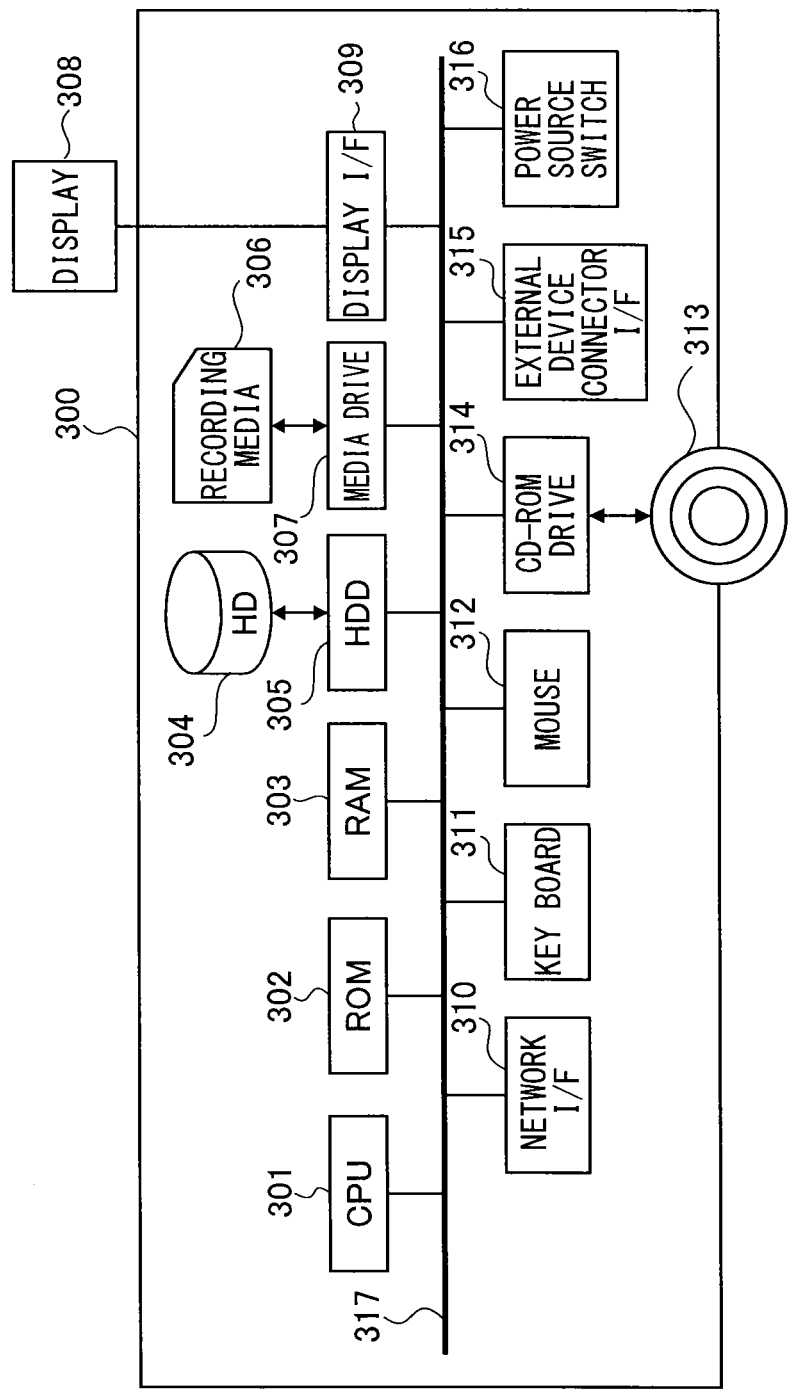
FIG. 4 is a block diagram showing one example of a hardware configuration of an information distribution server.

FIG. 4 illustrates one example of a configuration of hardware of the information distribution server 300 according to the first embodiment. The information distribution server 300 includes a CPU 301, a ROM 302, a RAM 303, an HD 304, a Hard Disk Drive (HDD) 305, a media drive 307, a display 308, a display I/F 309, a network I/F 310, a keyboard 311, a mouse 312, a CD-ROM drive 314, an external device connection part I/F 315, a power source switch 316, and a bus line 317.

The CPU 301 controls an entire operation of the information distribution server 300. The ROM 302 has a program by which the CPU 301 is executed. The RAM 303 is used as a work area of the CPU 301. The HD 304 stores various data of distribution information and so on. The HDD 305 controls reading or writing (storing) of the various data to the HD 304 in accordance with the control of the CPU 301. The media drive 307 controls reading or writing of data to a recording medium 306 such as a flash memory and so on. The display 308 displays various information of a cursor, a menu, windows, letters, images, and so on. The display I/F 309 transmits image data to the display 308. The network I/F 310 transmits data by use of the network. The keyboard 311 includes a plurality of keys inputting letters, numerals, various instructions. The mouse 312 performs selection and execution of various instructions, selection of processes objects, and movement of the cursor. The CD-ROM drive 314 controls reading or writing of the various data to a Compact Disc Read Only memory (CD-ROM) 313 which is one example of a detachable recording medium. The external device connection part I/F 315 connects external devices. The power source switch 316 switches ON and OFF of a power source of the information distribution server 300. The bus line 317 includes an address bus, a data bus or the like that electrically connects the components as described.

<Functional Configuration of Information Distribution System>

Figure 5:
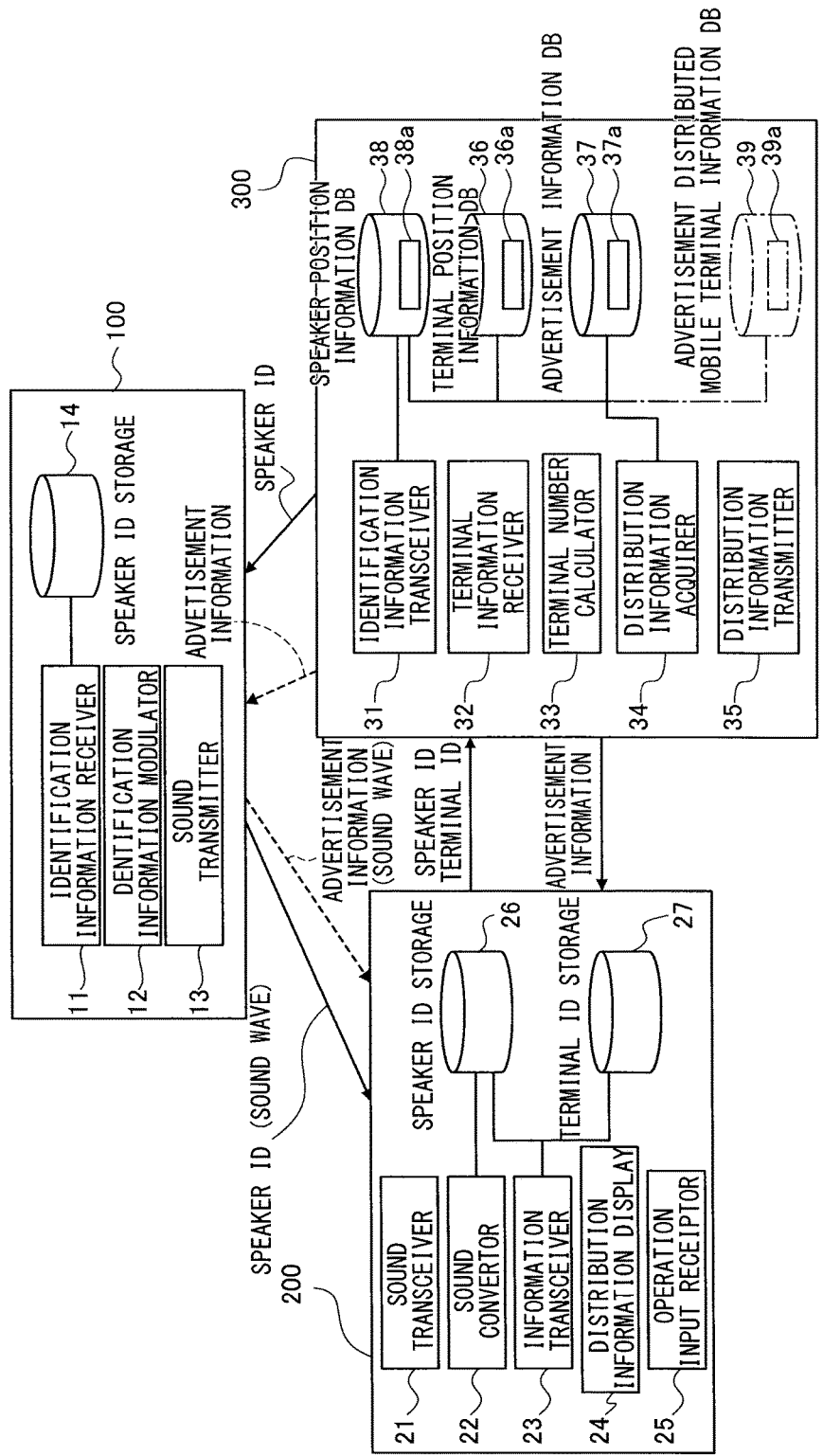
FIG. 5 is a block diagram showing functions of the information distribution system.

Next, a functional configuration of the information distribution system 1 in the first embodiment is described. FIG. 5 is a block diagram showing one example of a functional configuration of the information distribution system 1 according to the first embodiment.

A functional configuration of the sound wave transmitter 100 is first described. As shown in FIG. 5, the sound wave transmitter 100 includes an identification information receiver 11, an identification information modulator 12, a sound transmitter 13, and a speaker identification (ID) storage 14. The identification information receiver 11 is composed of the CPU 101 and the network I/F 115. The identification information receiver 11 represents results of command and calculation from the CPU 101 in FIG. 2 (the same hereinafter). The identification information modulator 12 is composed of the CPU 101 in FIG. 2, a modulator 109, and an amplifier 110. The sound transmitter 13 is composed of the CPU 101 in FIG. 2, and the sound input/output I/F 113. The speaker ID storage 14 is composed of the RAM 103, the recording medium 104 such as a flash memory in FIG. 2, and so on.

The identification information receiver 11 receives a speaker ID which is one example of identification information transmitted from the information distribution server 300 through the network 400 and stores it in the speaker ID storage 14. Here, if the sound wave transmitter 100 and the information distribution server 300 are in an off line, or the sound wave transmitter 100 is not connected to the network 400, a configuration of inputting the speaker ID from the touch keys of the operation panel 108 can be taken. A user can execute the input operation while confirming the speaker ID displayed on the display 106 with eyes. In this case, the speaker ID input from the operation panel 108 is stored in the speaker ID storage 14.

The identification information modulator 12 converts (modulates) the speaker ID into a predetermined format. As a method of the modulation, any known method may be used, without being limited. The sound transmitter 13 superimposes the speaker ID modulated by the identification information modulator 12 on background music (BGM) and announcement performed in the store, and so on and broadcasts from the speaker 112, or broadcasts the speaker ID alone from the speaker 112.

Next, a functional configuration of the mobile terminal 200 is described. As shown in FIG. 5, the mobile terminal 200 includes a sound transceiver 21, a sound convertor 22, an information transceiver 23, a distribution information display 24, an operation input reception part 25, a speaker ID storage 26, and a terminal ID storage 27.

The sound transceiver 21 is composed of the CPU 201 in FIG. 3 and the sound input and output part I/F 213. The sound convertor 22 is composed of the CPU 201. The information transceiver 23 is composed of the CPU 201 in FIG. 3, the communication part I/F 215, the wireless LAN communication part I/F 216, the short-distance wireless communication part I/F 219, and so on. The distribution information display 24 is composed of the CPU 201 in FIG. 3, the display I/F 221, and so on. The operation input reception part 25 is composed of the touch panel 222 in FIG. 3, the power source switch 223, and so on.

The speaker ID storage 26 and the terminal ID storage 27 are composed of the RAM 203, the EEPROM 204, the recording medium 208 such as the flash memory, and so on. Here, the mobile terminal 200 is an imager and so on composed of the imaging sensor I/F 206, the camera 205, and so on and has a function as a usual mobile terminal.

The speaker ID storage 26 stores identification information (first identification information) transmitted from the sound wave transmitter 100 to the mobile terminal 200. In the first embodiment, the speaker ID is used as the first identification information. Identification information of the mobile terminal 200 is previously stored in the terminal ID storage 27. In the first embodiment, as the identification information (second identification information) of the mobile terminal 200, telephone number is used.

The sound transceiver 21 has a function to receive sound (sound wave) and covert it in a sound signal and to convert the sound signal in sound and transmit it. The sound transceiver 21 receives sound wave emitted from the speaker 112 of the sound wave transmitter 100 and converts it in the sound signal.

The sound convertor 22 has a function to convert the sound signal received and converted by the sound transceiver 21 in the speaker ID and to store it in the speaker ID storage 26. A known suitable method can be used as a method of converting in the speaker ID.

The information transceiver 23 has a function to execute communication among the mobile terminal 200 and the information distribution server 300, other mobile terminal, devices, systems and so on. The information transceiver 23 transmits the speaker ID and the mobile terminal ID to the information distribution server 300 and receives advertisement information as the distribution information from the information distribution server 300. In addition, the information transceiver 23 executes download of utilization application of information distribution service in accordance with instructions (operations) from a user.

The distribution information display 24 has a function to edit image information and display it on the display 220. The distribution information display 24 edits the advertisement information received by the information transceiver 23 in accordance with display attribute and so on and displays it on the display 220.

The operation input reception part 25 has a function to accept various inputs by a user for operation of the mobile terminal 200. The operation input reception part 25 has a function to accept the download operation of utilization application of information distribution service through an operation of the touch panel 222 by a user. In addition, the operation input reception part 25 accepts the input of ON or OFF operation of the power source through the operation of the power source switch 116 by a user.

Next, a functional configuration of the information distribution server 300 is described. As shown in FIG. 5, the information distribution server 300 includes an identification information transceiver 31, a terminal information receiving part 32, a terminal number calculator 33, a distribution information acquirer 34, a distribution information transmitter 35, a terminal position information data base (DB) 36, an advertisement information data base (DB) 37, and a speaker position information data base (DB) 38.

The identification information transceiver 31, the terminal information receiving part 32, and the distribution information transmitter 35 are composed of the CPU 301 in FIG. 4 and the network I/F 310. The terminal number calculator 33 and the distribution information acquirer 34 are composed of the CPU in FIG. 4. The terminal position information data base 36, the advertisement information data base 37, and the speaker position information data base 38 are composed of the HD 304 in FIG. 4.

The identification information transceiver 31 has a function to transmit the speaker information ID as the identification information of the sound wave transmitter 100 to the sound wave transmitter 100. The speaker ID is related to the speaker position and previously stored in the speaker position information data base 38.

The terminal information receiving part 32 has a function to receive the speaker ID and the mobile terminal ID from the mobile terminal 200 and add (store) them to the terminal position information data base 36 together with an acquired time. The terminal number calculator 33 has a function to count every speaker ID the number of the mobile terminal 200 transmitting each speaker ID. The count number is stored in the RAM 303 and so on.

The distribution information acquirer 34 has a function to search from the advertisement information data base 37 the advertisement information as the distribution information related to the speaker ID and acquire it. The distribution information transmitter 35 has a function to transmit the acquired advertisement information to the predetermined mobile terminal 200 or the sound wave transmitter 100.

The terminal position information data base 36 has a terminal position information table 36a in which the speaker ID and the mobile terminal ID transmitted from the mobile terminal 200 are related to the acquired time and stored. FIG. 6 illustrates one example of a table structure of the terminal position information table 36a according to the first embodiment. As shown in FIG. 6, in the terminal position information table 36a, the speaker ID and the mobile terminal ID are related to the acquired time that acquires them and the time received by the terminal information receiving part 32 and stored.

The speaker ID is the identification information to specify the sound wave transmitter 100 and assigned to the speaker included in the sound wave transmitter provided in each store (see FIG. 2). As the speaker ID, suitable numerals, letters and so on can be used. In the first embodiment, the speaker ID is represented by characters "SP" showing the speaker and numerals (serial number). However, the speaker ID may be represented by use of a manufacturing number of the speaker 112, without being limited to the above representation.

The mobile terminal ID is the identification information to specify the mobile terminal 200. As the mobile terminal ID, suitable numerals, letters and so on can be used. In the first embodiment, the mobile terminal ID is represented by mobile phone number. However, the mobile terminal ID may be represented by use of a manufacturing number, an identification number, a mail address of the mobile terminal 200, or the like, without being limited to the above representation.

The acquired time is a time at the time when receiving the speaker ID and the mobile terminal ID from the mobile terminal 200. In the first embodiment, although a time (hour, minute) including a date is used, only time can be used, a time of second unit may be used.

The advertisement information data base 37 has an advertisement information table 37a in which an advertisement number, a store number, a store name, a distribution period, and advertisement information are stored. FIG. 7 illustrates one example of a table structure of the advertisement information table 37a. A store-related person wanting to distribute an advertisement accesses the information distribution server 300, and registers each data of the advertisement information data base 37.

The advertisement number is the identification information to specify the advertisement. In the first embodiment, the advertisement number is represented by numerals (serious number). The store number is the identification information to specify the store that distributes the advertisement information. In the first embodiment, a combination of the letter of "store" and numerals (serial number) is used as the store number. The store name is the name of the store to the store number and uses a character string in the first embodiment. The distribution period is a period distributing the advertisement. In the first embodiment, month and day are used as the distribution period. However, year, month, and day can be used and time may be included in them, as the distribution period.

The advertisement information is the distribution information which is distributed to the mobile terminal 200 of a user and displayed on the display 220. In the first embodiment, the advertisement information uses a character string, but may include therein, for example, attribute in displaying. It is, also, possible to set images and photographs displayed on the display 220 of the mobile terminal 200, sound information emitted from the speaker 112 and so on, as the advertisement information.

The distribution information transmitter 35 refers to the distribution period acquired from the advertisement information table 37a in distributing the advertisement information to the mobile terminal 200 and distributes the advertisement information after confirming that the distribution is in the distribution period. As a method of distributing, although there are cases where the advertisement information and the distribution period are distributed, it is possible to distribute required items with small information quantities and eliminate user's misunderstanding by distributing only the advertisement information. In the advertisement information table in the first embodiment shown in FIG. 7, as the distribution period, although the day is registered, hour or minute can be freely designated.

Figure 8:
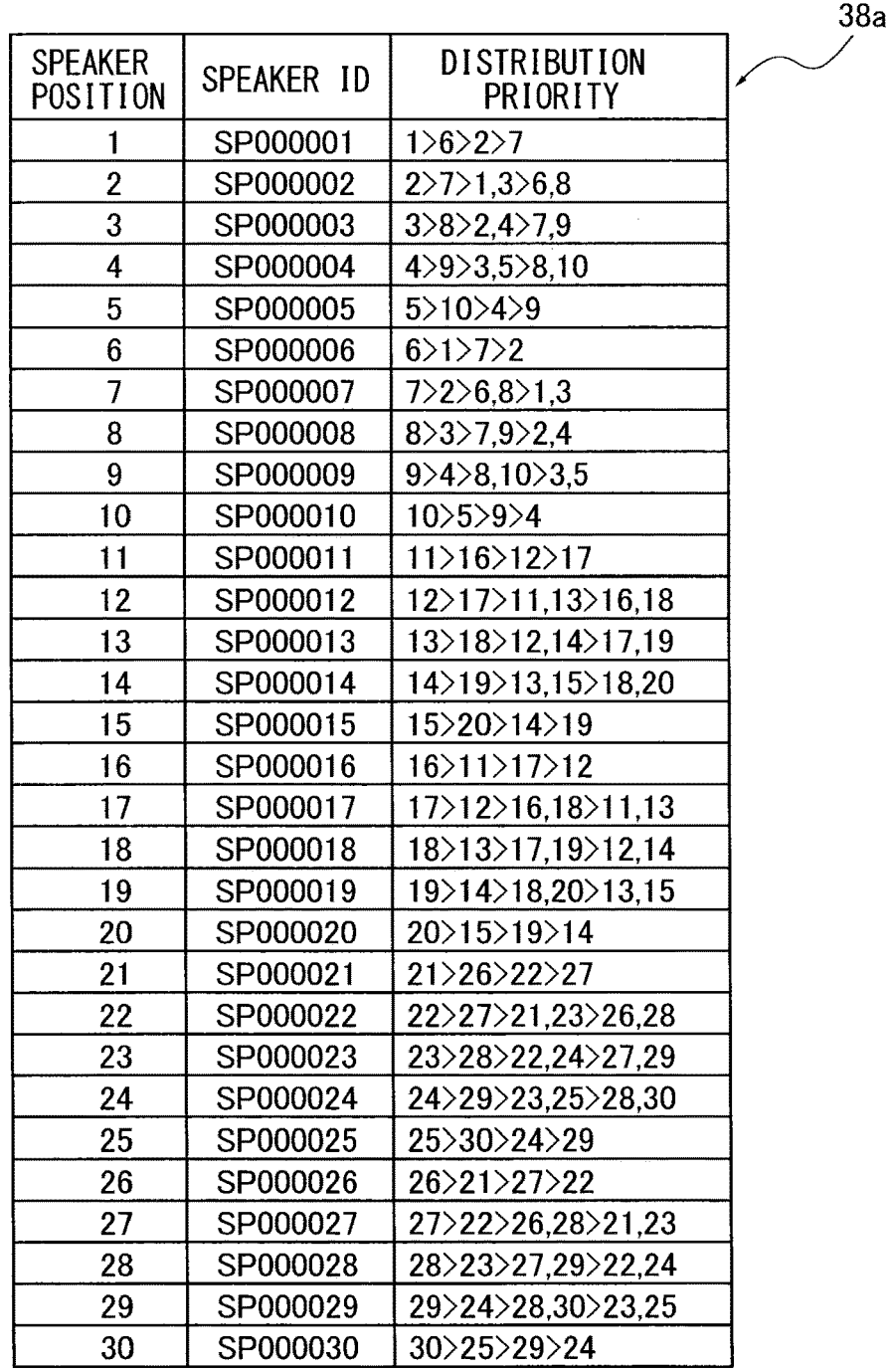
FIG. 8 is a table representing the speaker position information shown in FIG. 5.

The speaker position information data base 38 has a speaker position information table 38a in which a speaker position, a speaker ID, and distribution priority are stored. FIG. 8 illustrates one example of a table structure of the speaker position information table 38a according to the first embodiment.

The speaker position shown in FIG. 8 indicates a position where the speaker 112 of the sound wave transmitter 100 is provided, with numerals. In the speaker position, the speaker position and the speaker ID of the speaker 112 are related and registered. The distribution priority decides the priority in distributing advertisement information of other stores if there is no advertisement information to be distributed to the nearest store and is represented by the store number and inequality ">".

Accordingly, a facility manager previously determines which speaker ID the manager assigns to a speaker position of which speaker 112. Then, a store-related person and a supplier for advertisement distribution decide the advertisement distribution priority and set data of the distribution priority of the speaker position information table 38a. Note that, in the manner of the distribution priority, it is possible to distribute one advertisement and a plurality of advertisement information. In this case, it is possible to divide by comma ",", a plurality of store numbers distributed simultaneously and set them to be distribution priority.

It is effective that the distribution priority distributes advertisement information of an adjacent store(s) to the sound wave transmitter 100. For example, even if the advertisement information of a distant store is distributed, considerably effective advertisement is required to move a user to the store. On the contrary, the user is easy to go to the near store. Therefore, the speaker position of the speaker 112 provided in the store close to the store in which the sound wave transmitter 100 is provided is set in accordance with the priority which is previously decided. In the first embodiment, the priority of the distribution is decided to be order of "nearest store">"opposite store">"stores of both sides">"store diagonal in front".

[Information Distribution Service]

An operation of the information distribution processing (information distribution service) of the information distribution service 1 according to the first embodiment as described above is described with reference to the drawings.
<Speaker ID Registration>

A previous preparation as described below is first performed in executing the information distribution service. As described above, the facility manager first provides the sound wave transmitter 100 in each of stores T of a facility. FIG. 9 illustrates a relationship between a position of each of the stores T of the facility A such as a department store, a shopping center, a shopping street, and so on and a position of the speaker 112 of the sound wave transmitter 100 of each store. FIG. 9 illustrates an arrangement of the stores T (stores T1 to T30) and an arrangement of the speakers 112 of the sound wave transmitters 100. The end numeral of each of the stores T shows "store number". The number attached to the speaker 112 of each of the stores T represents "speaker position".

Next, a speaker ID and a distribution priority are decided with respect to the speaker position of the sound wave transmitter 100. The speaker ID and the distribution priority are stored in the speaker position information data base 38 by accessing the information distribution server 300. The speaker position information table 38a shown in FIG. 8 represents one example in which the speaker position, the speaker ID, and the distribution priority are related to correspond and stored in the speaker position information data base.

As shown in FIG. 8, for example, the speaker ID of the speaker 112 set to the speaker position "1" is set to "SP000001". The distribution priority is used to decide whether distributing the advertisement information of which store in the case where the advertisement is distributed to the mobile terminal 200 receiving a speaker ID, as described above.

In the case of, for example, the speaker ID, "SP000001", advertisement distribution priority, "1>6>2>7" is set. This means the following. The advertisement information of "store 1" (that is, a store where the speaker 112 of the speaker position "1" is provided in a passage and so on in front of the store) is first selected and distributed. However, if there no advertisement information of "store 1", the advertisement information of "store 6", (that is, a store where the speaker 112 of the speaker position "6" is provided in a passage and so on in front of the store, and so forth) is selected, and subsequently, the advertisement distribution of "store 2" is selected. In such an order, the priority of the advertisement to be distributed is decided.

Similarly, in a case of a speaker ID, "SP000002, advertisement distribution priority, "2>7>1, 3>6, 8" is set. The distribution priority in this case is decided as follows. That is to say, the advertisement information is selected and distributed in the order of "store 2", "store 7", "store 1" and "store 3", finally "store 6" and "store 8".

Next, the information distribution sever 300 is connected to the sound wave transmitter 100 and transmits the registered speaker ID to the speaker 112 of each sound wave transmitter 100. The sound wave transmitter 100 stores the received speaker ID in the speaker ID storage 14. Here, in FIG. 9, the result of the speaker ID set to the speaker 112 of each sound wave transmitter 100 in the information distribution sever 300 is shown to be "ID=SP0001".
<Distribution Information Registration>

Next, a store-related person such as an owner of each of the stores T accesses the advertisement information data base 37 by use of a PC terminal and so on of each of the stores T and registers the advertisement information (a distribution content, a distribution period and so on). FIG. 7 illustrates one example of the advertisement information. An advertisement number is attached in an order as registered. For example, in "store 1", it is registered that information of "all goods 20% OFF" in the distribution period from August 20 to August 27 is distributed. Note that the registration of the advertisement information may be executed, for example, by the facility manager or a manufacturer receiving the permission of the store-related person without the store-related person being registered.
<Down Load and Install of Utilization Application>

On the other hand, a user using the information distribution service operates the touch panel 222 and so on of the mobile terminal 200 and accesses the information distribution server 300 to download and install a utilization application of the information distribution service. The utilization application is installed in the RAM 203 and executed by the CPU 201. Thereby, the above-mentioned functions are operated in accordance with the commands of the CPU 201.
<Acquisition of Advertisement Information>

One example of acquisition of the advertisement information using the information distribution service is described hereinafter with reference to a sequence chart shown in FIG. 14.

The user first moves to a facility A that provides advertisement with an information distribution service and starts up the installed utilization application (step S1). On the other hand, a speaker ID is transmitted from the speaker 112 provided on the passage in the front of each of the stores T of the facility A (step S2). When the user moves in the facility A and approaches a store of the stores T, the sound transceiver 21 of the mobile terminal 200 held by the user receives a sound wave from the speaker 112, and the sound convertor 22 converts the sound wave in the speaker ID (step S3). Note that the acquired speaker ID is stored in the speaker ID storage 26.

The information transceiver 23 of the mobile terminal 200 transmits the speaker ID and the mobile terminal ID to the information distribution server 300 through a telephone line or the network 400 (step S4). FIG. 10 illustrates one example of the data structure of communication information transmitted from the mobile terminal 200.

When the information distribution server 300 receives (acquires) the speaker ID and the mobile terminal ID transmitted from the mobile terminal 200 (step S5), they are added to (stored in) the terminal position information data base 36, by adding an acquired time to each of them, as shown in FIG. 6 (step S6).

Information of the plurality of user's mobile terminals 200 is sequentially added to the terminal position information data base 36. Therefore, the terminal number calculator 33 of the information distribution server 300 counts the number of the mobile terminals 200 acquiring the speaker ID every predetermined interval (for example, for three seconds). Note that, at this time, overlapped mobile terminals are deleted. The processing is concretely described according to the sequence chart shown in FIG. 14. A difference between the previous totalization time and the current time is calculated (step S7). Whether the time difference is three minutes or in a predetermined time (predetermined period) is determined (step S8). If the difference is within the predetermined time, the sequence returns to step S5, and the receiving of the speaker ID and the mobile terminal ID and the addition to the terminal position information data base 36 are repeated.

When it is determined that the predetermined time passes in step S8, the sequence proceeds to step S9. In step S9, data added in the predetermined time is extracted from the terminal position information data base 36. Next, the extracted data is searched every speaker ID (step S10). In a case where the overlapped mobile terminal IDs exist, in other words, data of the same mobile terminal ID and the same speaker ID are transmitted, the overlapped data is deleted from the terminal position information data base 36 (step S11).

The number of the mobile terminal IDs (number of the mobile terminals 200) of every speaker ID is calculated (step S12). FIG. 11 illustrates a list in which the speaker ID and the counted number of the mobile terminals of every speaker ID are prepared to correspond. Numerals attached to a lower portion or upper portion of each store correspond to count numbers. In the list shown in FIG. 11, for example, the speaker ID "SP000001" of "store 1", twenty five of the mobile terminal IDs are calculated (counted). The number of the calculated mobile terminal IDs, and a content of a list shown in FIG. 12 may be temporarily stored in the RAM 303, or stored in the HD 304, the recording medium 306, or the like, as described below.

Next, the distribution information acquirer 34 extracts the speaker IDs in which the number of the mobile terminal IDs is predetermined numbers or more (for example, twenty numbers or more) (step S13). The previously decided distribution priority (the numbers of the stores T are represented by the priority) is extracted with respect to the extracted speaker IDs by accessing the speaker position information data base 38. Based on the distribution priority, by accessing the advertisement information data base 37, a distribution period of the advertisement information corresponding to each store of the distribution priority in the stores T is extracted (step S14 to the above).

Next, based on the extracted distribution priority and distribution period, advertisement information to be distributed is extracted (step S15). That is to say, the distribution period is confirmed, and when the current time is within the distribution period, the advertisement information of each of the stores T is selected as the advertisement information distributed with the speaker ID. When the current time is out of the distribution period, a distribution period of advertisement information of a store of the next priority of the stores T is confirmed. When the current time is within the distribution period, the advertisement information of each of the stores T is selected.

Figures 12, 13:
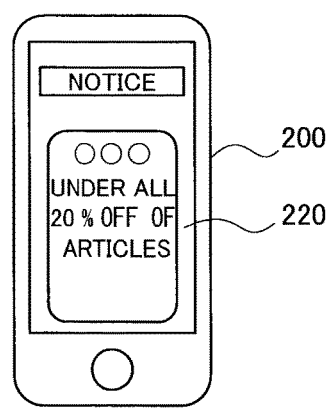
FIG. 12 is a table showing a list of advertisement information searched in accordance with distribution priority with respect to speaker IDs in which the number of the mobile terminal IDs is a predetermined number or more.
FIG. 13 is a front view of the mobile terminal showing one example of the advertisement information displayed on the mobile terminal.

FIG. 12 illustrates a list of the extraction result of the advertisement information every the speaker ID. As shown in FIG. 12, with respect to the speaker IDs, "SP000001", "SP000002", the advertisement information of the store 1 and the store 2 in which the speaker IDs are provided is extracted, and with respect to the speaker ID, "SP000024", because there is no advertisement information of a store 24, advertisement information of a nearest store 29 is extracted in accordance with distribution priority. The distribution information transmitter transmits the advertisement information extracted corresponding to each speaker ID to the mobile terminal 200 transmitting the speaker ID through the network 400 (step S16).

The information transceiver 23 of the mobile terminal 200 receives the advertisement information transmitted from the information distribution server 300 and the distribution information display 24 displays the advertisement information on the display 220 by generating a display image (step S17). FIG. 13 illustrates one example of the advertisement information displayed on the display 220. The advertisement information displayed on the display 220 is the advertisement information of the stores T or the nearest store T before which the user is walking. Therefore, the user looked at the advertisement information easily and directly enters the stores T, thereby improving customer attraction effect.

In the first embodiment, the transmission of the advertisement information is executed by directly transmitting it to the mobile terminal 200. However, as a variation, the advertisement information may be transmitted to the mobile terminal 200 by a sound wave through the sound wave transmitter 100. In the case where the advertisement information is directly transmitted to the mobile terminal 200, the advertisement information is transmitted to each of the plurality of mobile terminals 200. On the contrary, in the case where the advertisement information is transmitted to the mobile terminal 200 by the sound wave, there is an effect that a communication load can be reduced, because the advertisement information is transmitted to only one sound wave transmitter 100.

In the case where the advertisement information is transmitted the information distribution server 300 to the sound wave transmitter 100, as shown by dotted line in FIG. 5, the sound wave transmitter receives the advertisement information (step S18), modulates the advertisement information to a sound wave, and transmits to the mobile terminal 200 (step S19). In this case, for example, the identification information receiver 11 of the sound wave transmitter 100 receives the distribution information, and the identification information modulator 12 modulates the advertisement information to the sound wave and transmits the advertisement information with the sound from the sound transmitter 13 to the mobile terminal 200. The mobile terminal 200 receiving the sound from the sound wave transmitter 100 converts the sound wave in advertisement information, generates the display image in the same way to the above, and displays it on the display 220.

As described above, in the first embodiment, the speaker ID is transmitted from the speaker 112 to the mobile terminal 200 with the sound wave. The speaker ID and the mobile terminal ID received by the mobile terminal 200 are transmitted to the information distribution server 300. The information distribution server 300 counts the number of the mobile terminals 200 every predetermined period and speaker ID, and distributes the advertisement information to the mobile terminal 200 transmitting the speaker ID in which the count number reaches a predetermined number.

Accordingly, according to the first embodiment, the positions of users who are customers are specified by use of the sound wave, it is possible to deliver advertisement of adjacent stores to a place where users collect. As a result, it is possible to efficiently go around the stores by acquiring the advertisement of the adjacent stores at the user side. Furthermore, the advertisement information at the store side can be distributed to the users who place in the adjacent stores with focus on. Therefore, it is possible to efficiently and suitably distribute the advertisement information to the users.

In addition, as described in the variation, the advertisement information can be transmitted; thereby it is possible to reduce the receiving number of the mobile terminal 200 from the information distribution server 300. In this case, the information transmission by the sound wave has a small bit rate. Therefore, when transmitting the all advertisement information as in prior art, transmission frequency of the speaker ID is reduced and there is a case that influence on accuracy and there is a possibility of affecting on accuracy of a location of the user. However, in the first embodiment, by counting the number of the mobile terminals 200 and transmitting the advertisement information to only a place where users collect, it is possible to restrain the reduction of the transmission frequency of the speaker ID and efficiently distribute the advertisement information.

Second Embodiment

Next, an information distribution system according to a second embodiment is described with reference to drawings. A basic configuration of the information distribution system according to the second embodiment is similar to that of the information distribution system according to the first embodiment. A description thereof is omitted. A configuration and a function which are different from that of the information distribution system according to the first embodiment are mainly described as follows.

In the above-described first embodiment, the moving users who are walking around places close to the stores T are also counted. However, each of the moving users does not operate the mobile terminal 200, and a case not to notice the advertisement information is assumed. On the other hand, each of stopping users often operates the mobile terminal 200. Therefore, it is effective to distribute advertisement information to the stopping users.

Therefore, the information distribution system according to the second embodiment is configured to be capable of distributing the advertisement information to the stopping users in a predetermined period. To realize this, a speaker acquired in a period is added to the number of the mobile terminals 200, the number of the mobile terminals 200 acquired in a period before that are calculated, and the number of the mobile terminals 200 acquired with the same speaker ID in the two periods are counted. Thereby, it is possible to find the number of the stopping users in a predetermined period.

Next, an operation of information distribution service in the second embodiment is described. The registration to the speaker position information data base 38, the registration of the speaker IDs to the sound wave transmitter 100, the registration to the advertisement information data base 37, the download and the install of the utilization application, and so on are the same as that in the first embodiment as described above. An operation of acquisition of the advertisement information is described with reference to a sequence chart shown in FIG. 18 as follows.

<Acquisition of Advertisement Information in Second Embodiment>

FIG. 18 illustrates the sequence chart showing one example of the operation of the acquisition of the advertisement information using the information distribution service in the second embodiment. The same processing as that in the first embodiment is simply described.

As shown in FIG. 18, a user first starts up the utilization application as installed (step S21) and transmits a speaker ID from the speaker 112 provided on each of the stores T (step S22). The mobile terminal 200 that the user holds receives the sound wave from the speaker 112, and the sound wave is converted in a speaker ID (step S23), thereafter the speaker ID and a mobile terminal ID are transmitted to the information distribution server 300 (step S24).

The information distribution server 300 receives the speaker ID and the mobile terminal ID (step S25), adds (stores) them to the terminal position information data base 36 in addition an acquired time to them (step S26).

The information distribution server 300 calculates a difference between the totalization time and the current time (step S27), when the difference is within a predetermined time (for example, three minutes) (step S28), the sequence repeats step S25 to step S27. When the predetermined time passes, the added data are extracted from the terminal position information data base 36 in a predetermined time (step S29). The extracted data are searched every speaker ID (step S30), data of an overlapped mobile terminal ID are deleted from the terminal position information data base 36 (step S31). The processing as described above is the same as that in the first embodiment. Further, the following steps S32 to S34 are executed in the second embodiment. The processing of the steps can be executed by the terminal number calculator 33 and the distribution information acquirer 34.

Next, in the second embodiment, the terminal number calculator 33 prepares a list of the mobile terminal IDs every speaker ID (step S32). For example, FIG. 15 illustrates a list of mobile terminal IDs of the mobile terminal 200 acquiring the speaker ID="SP000001" in a period and a period before one thereof. In FIG. 15, fifteen mobile terminals 200 corresponding to the netted mobile terminal IDs acquire "SP000001" bridging the two periods. Therefore, it is considered that users of the fifteen mobile terminals 200 stop at an acquiring area of "SP000001".

Therefore, the terminal number calculator 33 reads out a list in the predetermined period before one in the list acquired in step S32 (step S33). Then as shown in FIG. 15, the number of the mobile terminals receiving the same speaker IDs in the two lists is calculated (step S34). FIG. 16 illustrates the list of the result in which the processing described above is carried out with respect to the entirety of the speaker IDs.

When the foregoing processing is carried out, subsequently, the distribution information acquirer 34 extracts the speaker IDs in which the number of the mobile terminal IDs is a predetermined number or more (for example, five or more) (step S35). The distribution information acquirer 34 acquires distribution priority from the speaker position information data base 38 with respect to each speaker ID as extracted and extracts a distribution period of the advertisement information from the advertisement information data base 37 based on the distribution priority (step S36). Next, the advertisement information to be distributed is extracted based on the distribution priority and the extracted distribution period (step S37).

FIG. 17 illustrates a list of extraction result of the advertisement information every speaker ID. In the second embodiment, as shown in FIG. 17, the advertisement information of the stores T in which the speakers are provided is acquired with top priority based on the distribution priority and the extracted distribution period. If there is no advertisement information of the stores T, the advertisement information of the nearest store is acquired based on the distribution priority and the extracted distribution period. The distribution information transmitter 35 transmits the extracted advertisement information to the mobile terminal 200 through the network 400 (step S38).

As described in the first embodiment, even in the second embodiment, the advertisement information can be, not only transmitted directly to the mobile terminal 200, but also transmitted to the mobile terminal 200 with the sound wave through the sound wave transmitter 100, as a variation. In this case, the information distribution server 300 transmits the advertisement information to the sound wave transmitter 100 in step S37. The sound wave transmitter 100 receives this advertisement information (step S40), modulates it to a sound wave, and transmits to the mobile terminal 200 (step S41).

The mobile terminal 200 receives the advertisement information transmitted from the information distribution server 300, or the sound wave transmitter 100 and displays the advertisement information on the display 220 (step S39), after the generation of conversion or display image is executed.

As described above, even in the second embodiment, the positions of the users who are customers are specified by use of the sound wave. It is possible to flow advertisement of the nearest store to a place where the users collect and to efficiently and suitably distribute the advertisement information to the users. In addition, in the second embodiment, by comparing the mobile terminal 200 acquiring the speaker IDs in a short period with the mobile terminal 200 acquiring the speaker IDs in a predetermined period before one, the number of the mobile terminals 200 acquiring the speaker IDs in both periods is counted. When the counted number reaches predetermined numbers, the advertisement information is transmitted to the mobile terminal 200 transmitting the speaker ID. Accordingly, it is possible to distribute the advertisement information to the users who are stopping and operating the mobile terminals and to efficiently and suitably distribute the advertisement information to the users.

Here, in the second embodiment, although the mobile terminals acquiring the speaker IDs are compared in the predetermined period and the period (passed period) before one, the passed period is not limited to the period before one. For example, the period before two or more may be selected. The passed period can be compared with the predetermined period which sets suitably a length (for example, minute) of time at which each of the users is stopping. In addition, in the second embodiment, although the advertisement information is transmitted to the mobile terminal 200 transmitting the speaker IDs in which the number of the mobile terminal IDs is predetermined numbers or more, the advertisement information can be transmitted even to one mobile terminal, regardless of the number of the mobile terminal IDs. Even in this case, it is possible to efficiently distribute the advertisement information, because the advertisement information is distributed to only the users who are stopping.

Third Embodiment

Next, an information distribution according to a third embodiment is described with reference to the accompanying drawings. A basic configuration of the information distribution system in the third embodiment is similar to that of the information distribution system 1 in the first embodiment, except that an advertisement distributed mobile terminal information data base (DB) 39 as shown by one dot chain line in FIG. 5 is further provided. A further description of the basic configuration is omitted. Function of the third embodiment different from that of the first embodiment is mainly described as follows.

First, in the first embodiment, if the same mobile terminal IDs and the same speaker IDs have been transmitted over a plurality of times in a predetermined time, the overlapped data are deleted (see step S11 in the first embodiment). Thereby, the same advertisement information is prevented from being transmitted to the same mobile terminal 200 over a plurality of times in a predetermined time. This is the same even in the second embodiment. However, when the same mobile terminal IDs and the same speaker IDs are again transmitted even after a predetermined time lapses, in other words, when a user walks around the same store at several times changing times, there is a case where the same advertisement information is transmitted to the same mobile terminal 200 over a plurality of times. When such a state frequently continues, there is a case that interests of the user in advertisement information and service are reduced.

Therefore, in the third embodiment, measures in which the advertisement information distributed in the past is not transmitted, or the same advertisement information as the advertisement information distributed in the past is not transmitted in a fixed period after the transmission are taken. Thereby, the third embodiment intends to prevent the interests of the user in the advertisement information and so on from being reduced, and provide the information distribution system 1 capable of further suitably distributing the advertisement information.

To realize this, the third embodiment includes the advertisement distributed mobile terminal information data base 39 as shown by one dot chain line in FIG. 5, in addition to the terminal position information data base 36, the advertisement information data base 37, and the speaker position information data base 38. The advertisement distributed mobile terminal information data base 39 is carried out by the HD 304 shown in FIG. 4 and includes an advertisement distributed mobile terminal information table 39a in which speaker IDs, mobile terminal IDs of the mobile terminal 200 acquiring the speaker IDs, acquired times of identification information from the mobile terminals, and advertisement numbers distributed in the past and distribution times of the advertisement numbers are stored. FIG. 20 illustrates one example of a table structure of the advertisement distributed mobile terminal information table 39a in the third embodiment.

Next, an operation of the information distribution system 1 in the third embodiment is described. The registration to the speaker position information data base 38, the registration of the speaker IDs to the sound wave transmitter 100, the registration to the advertisement information data base 37, the download and the install of the utilization application, and so on are the same as that in the first embodiment as described above. Therefore, an operation of acquisition of advertisement information is described with reference to a sequence chart shown in FIG. 22 as follows.

<Acquisition of Advertisement Information in Third Embodiment>

FIG. 22 illustrates the sequence chart showing one example an operation of the acquisition of advertisement information employing the information distribution service in the third embodiment. Processing from steps S51 to S65 is the same as that of steps S1 to S15 in the first embodiment as described above. Therefore, a further description of these steps is omitted. However, in the third embodiment, a predetermined time to receive the speaker IDs and the mobile IDs is, for example, two minutes.

The acquisition of the advertisement information is described hereinafter by supposing a case where the information distribution server 300 receives the speaker IDs and the mobile terminal IDs from the mobile terminal 200, at the time of 15:00, Aug. 26, 2014. In the information distribution system 1 in the third embodiment, in the processing until step S65, advertisement information to be distributed is extracted with respect to the speaker IDs in which the number of the mobile terminals 200 is a predetermined number or more (see the list of the extraction result of the first embodiment shown in FIG. 12).

Even in the third embodiment, the mobile terminal IDs of the mobile terminals transmitting the speaker IDs and the acquired times every speaker ID are added to the terminal position information data base 36, similarly to the first embodiment. Thereof, for example, the list of the mobile terminals 200 acquiring the speaker ID: SP000001 at the time of 15:00 Aug. 26, 2014 is shown in a left chart of FIG. 19. In the mobile terminal 200 in the list, a case where the advertisement information corresponding to the speaker IDs has been distributed in the past, the following processing is executed such that the advertisement information is not overlappedly distributed.

The distribution information acquirer 34 first accesses the advertisement distributed mobile terminal information data base 39 and acquires advertisement distributed mobile terminal information to prepare a list of the mobile terminal 200 that distributes the advertisement information in the past (advertisement distributed mobile terminal information list) (step S66).

FIG. 20 illustrates data stored in the advertisement distributed mobile terminal information data base 39 at the time of 15:00 Aug. 26, 2014. From the advertisement distributed mobile terminal information based on the data, it is possible to acquire the mobile terminal ID in which the advertisement information of an advertisement number 1 was distributed in the past.

Figure 19:
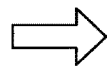
FIG. 19 is a table showing a list (left table part) of mobile terminals acquiring the speaker ID=SP000001 at a time and a list (right table part) of mobile terminals from which information of overlapped mobile terminals IDs is deleted.

Next, the mobile terminal ID in the advertisement distributed mobile terminal information list is compared with the mobile terminal IDs in FIG. 19. If there are overlapped mobile terminal IDs in the two lists, it is determined that the advertisement information of the advertisement number 1 has been already distributed, the mobile terminal IDs are deleted from the list of the mobile terminal IDs shown in FIG. 19 (step S67). The state after the deletion is shown in a right cart in FIG. 19.

The distribution information transmitter 35 transmits the advertisement information extracted in step S65 to the mobile terminal 200 remaining on the list of the mobile terminal IDs shown in the right chart of FIG. 19 (step S68). The mobile terminal 200 receives the advertisement information transmitted from the information distribution server 300, the conversion or the generation of a display image is performed to the advertisement information, thereafter, and the advertisement information is displayed on the display 220 (step S69).

Even in this case, as a variation, the distribution information transmitter 35 transmits the advertisement information to the sound wave transmitter 100, and the sound wave transmitter 100 receiving the advertisement information in step S70 can also transmit the advertisement information to the mobile information terminal 200 with the sound wave in step S71.

When the transmission of the advertisement information is completed, the distribution information acquirer 34 stores the distribution result in the advertisement distributed mobile terminal information data base 39 (step S69). In this case, the distribution information acquirer 34 stores the speaker IDs, the mobile terminal IDs, the acquired time, as well as the distributed advertisement numbers (advertisement number 1 here), and the distribution time (at 15:02 here). Thereby, the advertisement information of the advertisement number 1 is not overlappedly transmitted in August 26 even to the mobile terminal 200 of the mobile terminal IDs stored additionally this time.

As described above, even in the third embodiment, it is possible to specify the positions of users who are customers by use of the sound wave, flow the advertisement of nearest stores to a place where the users collect, and efficiently and suitably distribute the advertisement information to the users. In addition, in the third embodiment, the advertisement distributed mobile terminal information data base 39 controls to relate the advertisement information distributed in the past to the mobile terminal IDs not to distribute the same advertisement number to the same mobile terminal 200. Therefore, the advertisement easily attracts the interest of users, and is hard to be ignored to the users, and the users positively utilize the service, as a result, it is possible to further efficiently and suitably distribute the advertisement information to the users.

The data of the advertisement distributed mobile terminal information data base 39 may be initialized after business hours of the facility A and so on were expired, or on the initiation of the next business. Thereby, the same advertisement information is not transmitted to the same mobile terminal 200 on the same business day. However, the advertisement information is distributed at least once on other business day, and hence can attract the interest of users again. Or, it is, also, possible to distribute the advertisement information to the same mobile terminal 200 only once in an event period by cumulatively storing the data in the advertisement distributed mobile terminal information data base 39 in the event period.

Or, the same advertisement number is not distributed to the same mobile terminal 200 in a predetermined time, every several minutes or several hours, morning or afternoon. After the predetermined time passes, the same advertisement information may be distributed. In this case, the data at which the predetermined time passes may be deleted at fixed intervals from the advertisement distributed mobile terminal information data base 39. Without deleting the data, it is possible to distribute the advertisement information only in a case where it is determined that the predetermined time passes, referring to the previous distribution time. A suitable manner can be adopted in accordance with an object. In every case, distributing more than necessary the same advertisement information to the same user is restrained and efficient information distribution can be accomplished.

Moreover, in the third embodiment, the speaker IDs in which the number of the mobile terminals is the predetermined number or more are extracted, and the advertisement information is distributed to the mobile terminal 200 transmitting the speaker IDs, similarly to the first embodiment. However, the third embodiment is not limited to this. Regardless of the number of the mobile terminals 200, it is possible to distribute the advertisement information to the mobile terminals 200 which transmits the mobile terminal IDs and the speaker IDs and in which the same advertisement information is not transmitted in the past. Even in this case, in the third embodiment, because the same advertisement information distributed to the same mobile terminal 200 in the past is not distributed in the predetermined period, it is possible to efficiently and suitably distribute the advertisement information without the interest of the users being reduced.

Although the several embodiments of the present invention have been described, it should be noted that the present invention is not limited to these embodiments, various modifications and changes can be made to the embodiments by those skilled in the art as long as such modifications and changes are within the scope of the present invention as defined by the Claims.

What is claimed is:

1. An information distribution system, comprising:
a sound wave transmitter;
a plurality of mobile terminals; and
an information distribution device, wherein
the sound wave transmitter transmits identification information to identify the sound wave transmitter,
one or more of the mobile terminals receive the identification information and transmit the identification information to the information distribution device,
the information distribution device is configured to record, for a location of the sound wave transmitter, information associated with the identification information of the sound wave transmitter and a number of the one or more of the mobile terminals that transmit the identification information, and transmit distribution information related to the identification information received from the one or more of the mobile terminals to the one or more of the mobile terminals, and
the information distribution device counts the number of the one or more of the mobile terminals that transmit the identification information in a predetermined period and transmits the distribution information to the one or more of the mobile terminals that transmit the identification information in which the number of the one or more of the mobile terminals reaches a predetermined number.

2. An information distribution system, comprising:
a sound wave transmitter;
a plurality of mobile terminals; and
an information distribution device, wherein
the sound wave transmitter transmits identification information to identify the sound wave transmitter,
one or more of the mobile terminals receive the identification information and transmit the identification information to the information distribution device,
the information distribution device is configured to record, for a location of the sound wave transmitter, information associated with the identification information of the sound wave transmitter and a number of the one or more of the mobile terminals that transmit the identification information, and transmit distribution information related to the identification information received from the one or more of the mobile terminals to the one or more of the mobile terminals, and
the information distribution device is configured to compare a mobile terminal which transmits the identification information in a predetermined period and another mobile terminal which transmits the identification information in a past predetermined period that is older than the predetermined period and transmit the distribution information to a mobile terminal which transmits the same identification information in both the first predetermined period and the second predetermined period.

3. The information distribution system according to claim 2, wherein
the information distribution device is configured to count a number of mobile terminals which transmit the identification information,
when the number of mobile terminals which transmit the same identification information in both the predetermined period and the past predetermined period reaches a predetermined number, the information distribution device is configured to transmit the distribution information to the one or more of the mobile terminals which transmit the identification information.

4. An information distribution system, comprising:
a sound wave transmitter;
a plurality of mobile terminals; and
an information distribution device, wherein
the sound wave transmitter transmits identification information to identify the sound wave transmitter,
one or more of the mobile terminals receive the identification information and transmit the identification information to the information distribution device,
the information distribution device is configured to record, for a location of the sound wave transmitter, information associated with the identification information of the sound wave transmitter and a number of the one or more of the mobile terminals that transmit the identification information, and transmit distribution information related to the identification information received from the one or more of the mobile terminals to the one or more of the mobile terminals, and
the information distribution device is configured to compare a mobile terminal which transmits the identification information in a predetermined period and another mobile terminal which transmits the identification information in a past predetermined period that is older than the predetermined period and transmit the distribution information to a mobile terminal which does not transmit the identification information in the past predetermined period.

5. The information distribution system according to claim 4, wherein
the information distribution device is configured to compare the mobile terminal which transmits the identification information in the predetermined period and the other mobile terminal which transmits the identification information in the past predetermined period and decide whether transmitting the distribution information to the mobile terminal which transmits the same identification information in both the predetermined period and the past predetermined period in accordance with a time in which the distribution information corresponding to the identification information is transmitted in the past predetermined period.

6. The information distribution system according to claim 1, wherein
the information distribution device is configured to select at least one of the distribution information regarding the location where the sound wave transmitter having the identification information is placed and nearest places based on a predetermined distribution priority and transmit the at least one of the distribution information and the nearest places to the one or more of the mobile terminals.

7. The information distribution system according to claim 1, wherein
the information distribution device is configured to transmit the distribution information to the one or more of the mobile terminals through the sound wave transmitter.

* * * * *